United States Patent [19]
Kato

[11] Patent Number: 5,607,177
[45] Date of Patent: Mar. 4, 1997

[54] DEFORMABLE SUSPENSION ARM FOR AUTOMOTIVE VEHICLE

[75] Inventor: Yoshihisa Kato, Aichi-ken, Japan

[73] Assignee: Toyota Jidosha Kabushiki Kaisha, Aichi-ken, Japan

[21] Appl. No.: 493,283

[22] Filed: Jun. 21, 1995

[30] Foreign Application Priority Data

Jun. 24, 1994 [JP] Japan ................... 6-143606
May 1, 1995 [JP] Japan ................... 7-107614

[51] Int. Cl.⁶ .................. B60G 7/00; B60G 3/00
[52] U.S. Cl. .......... 280/673; 280/688; 280/690; 188/377
[58] Field of Search ............ 180/274; 280/784, 280/673, 663, 660, 675, 688, 690, 691; 188/377, 371; 296/189; 267/228

[56] References Cited

U.S. PATENT DOCUMENTS

| | | | |
|---|---|---|---|
| 4,157,840 | 6/1979 | Kroniger et al. | 280/688 |
| 4,334,693 | 6/1982 | Huber | 280/660 |
| 4,702,515 | 10/1987 | Kato et al. | 188/377 |
| 4,772,043 | 9/1988 | Muramatsu | 280/690 |
| 5,322,317 | 6/1994 | Kusaka et al. | 280/673 |
| 5,362,090 | 11/1994 | Takeuchi | 280/673 |

FOREIGN PATENT DOCUMENTS

| | | | |
|---|---|---|---|
| 58-67507 | 4/1983 | Japan | 280/688 |
| 59-102606 | 6/1984 | Japan | 280/690 |
| 2-16306 | 2/1990 | Japan . | |
| 2-25304 | 2/1990 | Japan . | |
| 2-30708 | 2/1990 | Japan . | |
| 2-16305 | 2/1990 | Japan . | |
| 2-262407 | 10/1990 | Japan | 280/688 |
| 3-61105 | 3/1991 | Japan | 188/377 |
| 4-135805 | 12/1992 | Japan . | |
| 5-112111 | 5/1993 | Japan | 280/673 |

*Primary Examiner*—Brian L. Johnson
*Assistant Examiner*—Peter C. English
*Attorney, Agent, or Firm*—Oliff & Berridge

[57] ABSTRACT

A suspension arm adapted for use in a suspension system of an automotive vehicle, the suspension arm being composed of an arm member made of a sheet metal pressed in a predetermined shape and having a pair of spaced front and rear mounting portions mounted on a vehicle body structure at two positions spaced in a fore-and-aft direction of the vehicle and a support portion for supporting a road wheel mounted thereon, wherein the arm member has a deformable portion which is formed to ensure transverse stiffness of the suspension arm in a lateral direction of the vehicle and located between the front and rear mounting portions to be buckled when applied with an impact force in the fore-and-aft direction of the vehicle.

15 Claims, 17 Drawing Sheets

DEFORMABLE SUSPENSION ARM FOR AUTOMOTIVE VEHICLE

BACKGROUND OF THE INVENTION

1. Field of the Invention

The present invention relates to a suspension arm adapted for use in a suspension system of an automotive vehicle, and more particularly to a suspension arm of the type which has a pair of spaced mounting portions mounted on a vehicle body structure at two positions spaced in a fore-and-aft direction of the vehicle and a support portion supporting thereon a road wheel.

2. Description of the Prior Art

Disclosed in Japanese Patent Laid-open Publication No. 135805/1992 is a lower suspension arm of the type which is composed of a pair of long and short arm members mounted at their one ends on a vehicle body structure at front and rear positions spaced in a fore-and-aft direction of the vehicle. The long arm member is adapted to support a road wheel at its other end, while the short arm member is connected at its other end to an intermediate portion of the long arm member by means of a pair of spaced bolts to provide a low stiffness portion. In the lower suspension arm, the connected portion of the arm members is buckled deformed when applied with a great impact force in a fore-and-aft direction of the vehicle.

In such a lower suspension arm as described above, however, the stiffness of the arm members in a lateral direction of the vehicle is decreased as well as the stiffness in the fore-and-aft direction of the vehicle. As a result, the suspension arm can be deformed when applied with an impact force in the lateral direction of the vehicle in a sudden braking operation.

SUMMARY OF THE INVENTION

It is, therefore, a primary object of the present invention to provide an improved suspension arm which is reinforced in a lateral direction of the vehicle to enhance transverse stiffness thereof and formed to absorb a great impact force applied thereto in a fore-and-aft direction of the vehicle.

According to the present invention, the object is accomplished by providing a suspension arm adapted for use in a suspension system of an automotive vehicle, the suspension arm having a pair of spaced front and rear mounting portions mounted on a vehicle body structure at two positions spaced in a fore-and-aft direction of the vehicle and a support portion for supporting a road wheel mounted thereon, wherein the suspension arm is provided with a deformable portion that is formed to ensure transverse stiffness of the suspension arm in a lateral direction of the vehicle and located between the front and rear mounting portions to be buckled when applied with an impact force in the fore-and-aft direction of the vehicle.

According to an aspect of the present invention, there is provided a suspension arm adapted for use in a suspension system of an automotive vehicle, the suspension arm comprising an arm member made of sheet metal pressed in a predetermined shape and having a pair of spaced front and rear mounting portions mounted on a vehicle body structure at two positions spaced in a fore-and-aft direction of the vehicle and a support portion for supporting a road wheel mounted thereon, wherein the arm member has a deformable portion that is formed to ensure transverse stiffness in a lateral direction of the vehicle and located between the front and rear mounting portions to be buckled when applied with an impact force in the fore-and-aft direction of the vehicle.

In a practical embodiment of the present invention, the deformable portion of the arm member is in the form of a plurality of grooves or ridges extending from the support portion toward the front and rear mounting portions.

BRIEF DESCRIPTION OF THE DRAWINGS

Other objects, features and advantages of the present invention will be more readily appreciated from the following detailed description of preferred embodiments thereof when taken together with the accompanying drawings, in which.

In the drawings, the same component parts and portions will be designated by the same or similar reference numerals.

DESCRIPTION OF THE PREFERRED EMBODIMENTS

Figure 1:
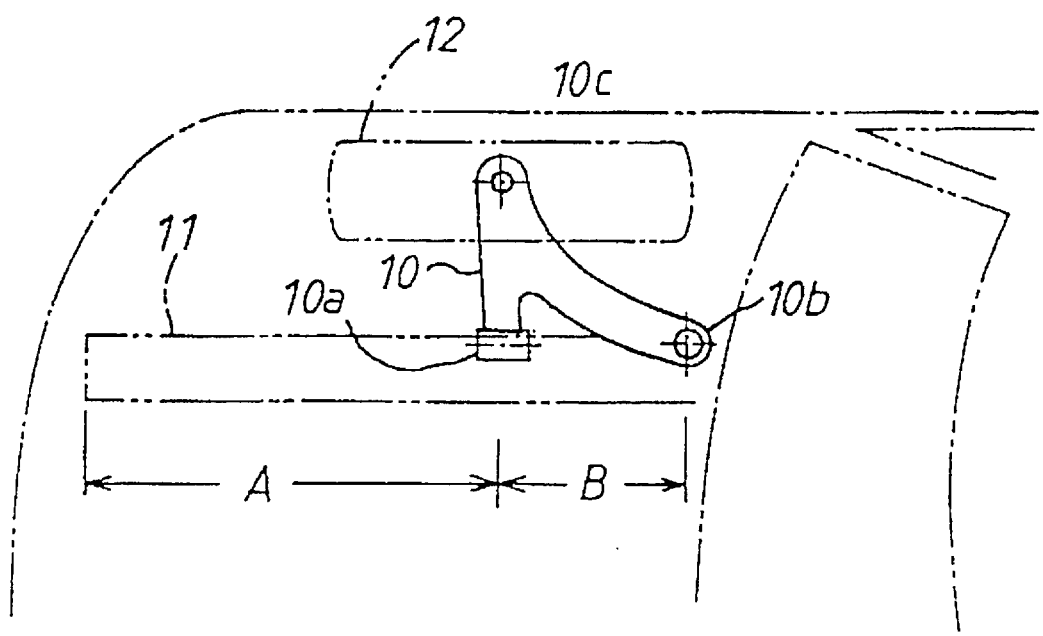
FIG. 1 is a schematic illustration of a suspension system in an automotive vehicle.

In FIG. 1 of the drawings, there is schematically illustrated a first embodiment of a lower suspension arm 10 in accordance with the present invention. The suspension arm 10 is formed in an approximately L-shape and has a pair of spaced front and rear mounting portions 10a, 10b mounted on a vehicle body structure at two positions spaced in a fore-and-aft direction of the vehicle and a support portion 10c supporting a road wheel 12 mounted thereon. The front mounting portion 10a of suspension arm 10 is in the form of a cylindrical sleeve which is mounted on a horizontal side rail 11 through a bush (not shown) for rotary movement about an axis line of the side rail 11. The rear mounting portion 10b of suspension arm 10 is in the form of a cylindrical sleeve that is mounted on the side rail 11 through a bush (not shown) for rotary movement about a vertical axis line. The side rail 11 is extended in the fore-and-aft direction of the vehicle and secured to one side of the vehicle body structure. The support portion 10c of suspension arm 10 is connected to a carrier of the road wheel 12 by means of a ball joint (not shown) in a usual manner.

Figure 2A:
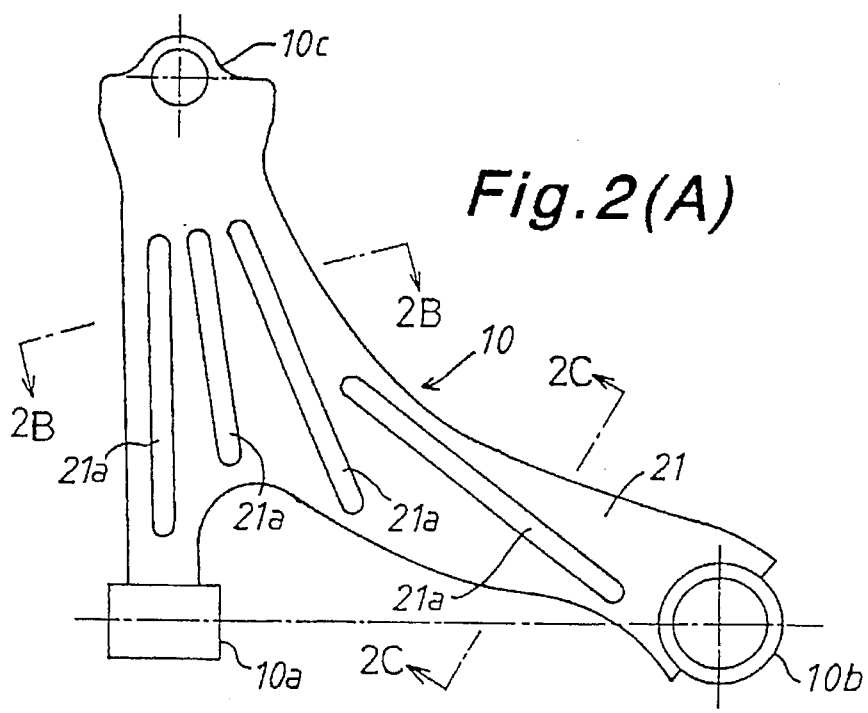
FIG. 2(A) is a plan view of a first embodiment of a lower suspension arm in accordance with the present invention.
Figure 2B:
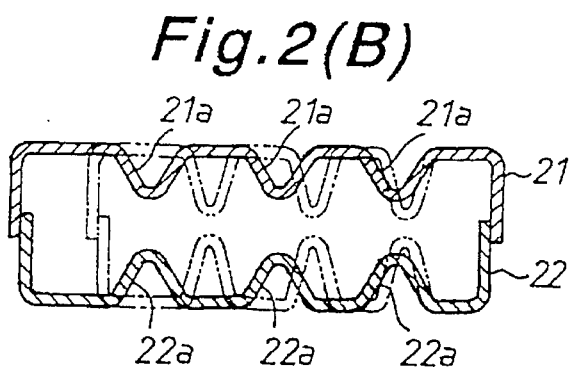
FIG. 2(B) is a cross-sectional view taken along line 2B—2B in FIG. 2(A)
Figure 2C:
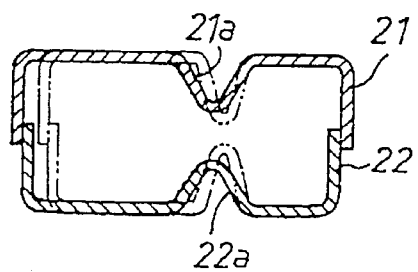
FIG. 2(C) is a cross-sectional view taken along line 2C—2C in FIG. 2(A)
Figure 3A:
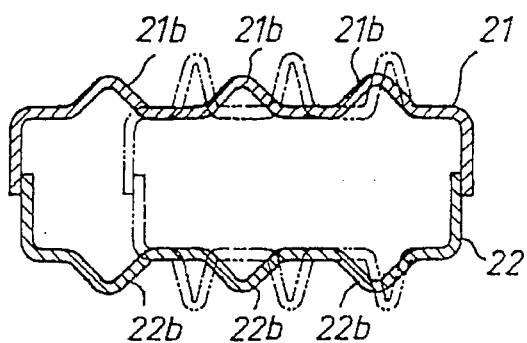
FIGS. 3(A)–3(D) illustrate modifications of the lower suspension arm shown in FIG. 2(A), in cross-section.
Figure 3B:
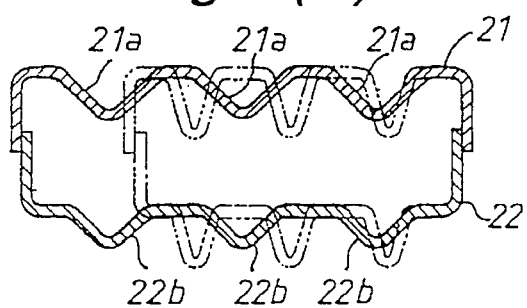
Figure 3C:
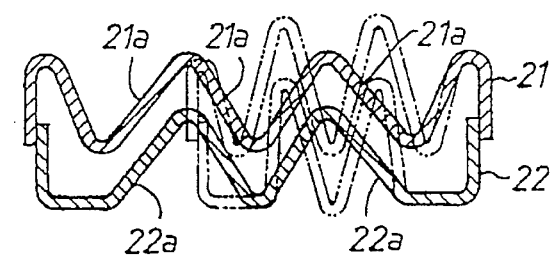
Figure 3D:
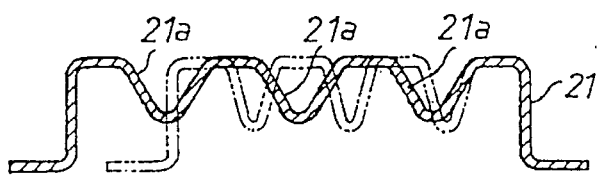

As shown in FIGS. 2(A)–2(C), the lower suspension arm 10 is composed of upper and lower arm members 21 and 22 each of which is made of sheet metal pressed in an L-shape. The upper and lower arm members 21 and 22 are coupled with each other and welded at their outer peripheries to one another. The upper and lower arm members 21 and 22 are respectively formed with a plurality of spaced V-grooves 21a, 22a which extend from the support portion 10c toward the front and rear mounting portions 10a and 10b.

In such a construction as described above, the lower suspension arm 10 is buckled or deformed at its grooved portions 21a, 22a as shown by imaginary lines in FIG. 2(B) when applied with a great impact force in the fore-and-aft direction of the vehicle. This is effective to absorb the impact applied to the suspension arm 10. On the other hand, the grooved portions 21a, 22a of upper and lower arm members 21, 22 are useful to enhance transverse stiffness of the suspension arm 10 in a lateral direction of the vehicle and to firmly support the road wheel 12 against an impact force applied thereto.

As illustrated in FIGS. 3(A)–3(D), the lower suspension arm 10 may be modified in cross-section. In a modification shown in FIG. 3(A), the grooved portion 21a of upper arm member 21 is replaced with a plurality of upwardly protruding ridges 21b, while the grooved portion 22a of lower arm member 22 is replaced with a plurality of downwardly protruding ridges 22b. In another modification shown in FIG. 3(B), only the grooved portion 22a of lower arm member 22 is replaced with a plurality of downwardly protruding ridges 22b. In a further modification shown in FIG. 3(C), the V-grooves 21a, 22a of upper and lower arm members 21 and 22 are respectively formed adjacent one another and overlapped with each other in a vertical direction. In a modification shown in FIG. 3(D), the lower suspension arm 10 is composed of only the upper arm member 21 without provision of the lower arm member 22. In these modifications, the lower suspension arm 10 is buckled or deformed at its ridged or grooved portions 21b, 22b or 21a, 22a when applied with a great impact force in the fore-and-aft direction of the vehicle. This is effective to absorb the impact applied to the suspension arm 10 in the fore-and-aft direction of the vehicle. On the other hand, the ridged or grooved portions 21b, 22b or 21a, 22a of the upper and lower arm members 21 and 22 are useful to enhance transverse stiffness of the suspension arm 10 against an impact applied thereto in the lateral direction of the vehicle.

Figure 4A:
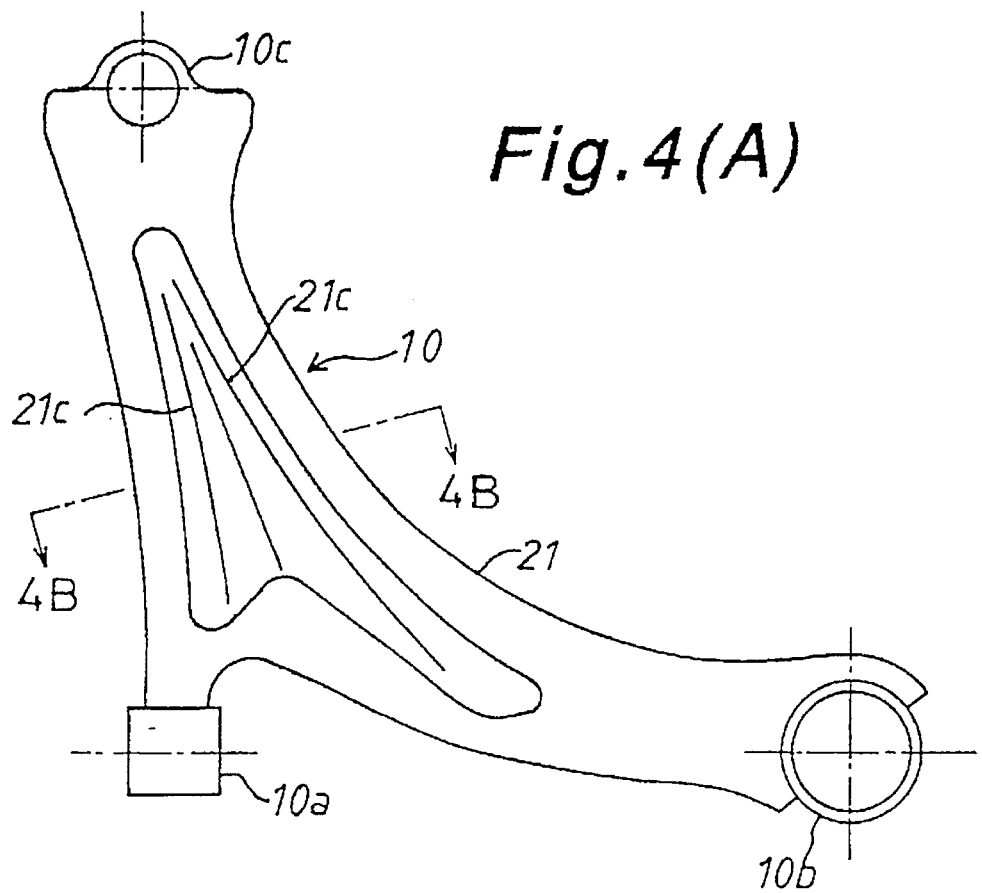
FIG. 4(A) is a plan view of a second embodiment of a lower suspension arm in accordance with the present invention.
Figure 4B:
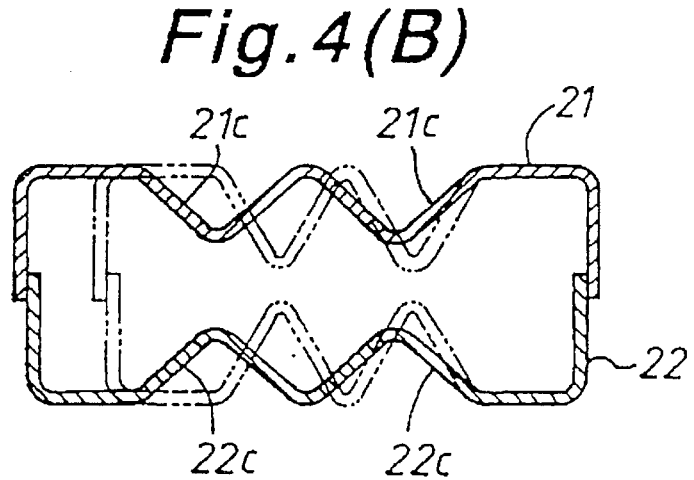
FIG. 4(B) is a cross-sectional view taken along line 4B—4B in FIG. 4(A)

Illustrated in FIGS. 4(A) and 4(B) is a second embodiment of a lower suspension arm 10 in accordance with the present invention, wherein the suspension arm 10 is composed of upper and lower arm members 21 and 22 each of which is made of sheet metal pressed in an L-shape. The upper and lower arm members 21 and 22 are coupled with each other and welded at their outer peripheries to one another. The upper and lower arm members 21 and 22 are respectively formed with a plurality of adjacent V-grooves 21c, 22c which are extended from the support portion 10c toward the front and rear mounting portions 10a and 10b.

In this embodiment, the lower suspension arm 10 is buckled or deformed at its grooved portions 21c, 22c as shown by imaginary lines in FIG. 4(B) when applied with a great impact force in the fore-and-aft direction of the vehicle. This is effective to absorb the impact applied to the suspension arm 10 in the fore-and-aft direction of the vehicle. On the other hand, the grooved portions 21c, 22c of upper and lower arm members 21, 22 are useful to enhance transverse stiffness of the suspension arm 10 in the lateral direction of the vehicle and to firmly support the road wheel 12 against an impact applied thereto.

Figure 5A:
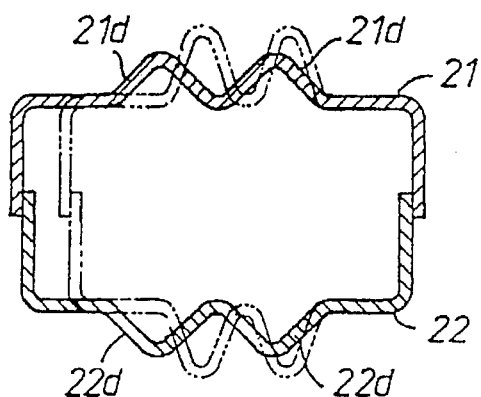
FIGS. 5(A)–5(F) illustrate modifications of the lower suspension arm shown in FIG. 4(A)
Figure 5B:
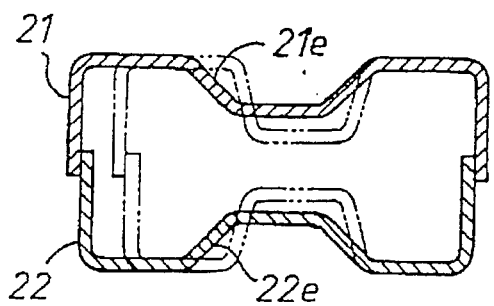
Figure 5C:
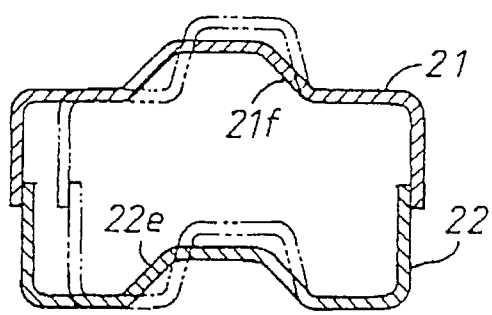
Figure 5D:
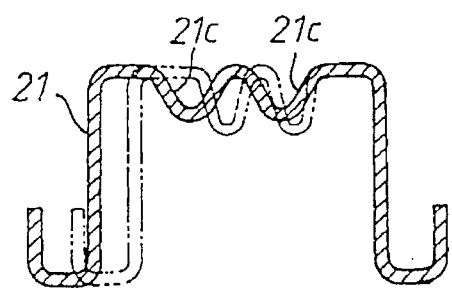
Figure 5E:
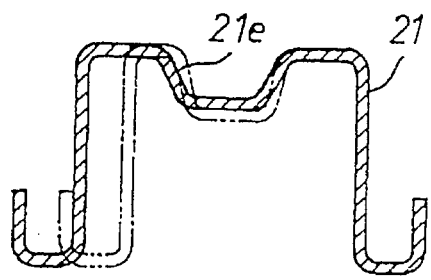
Figure 5F:
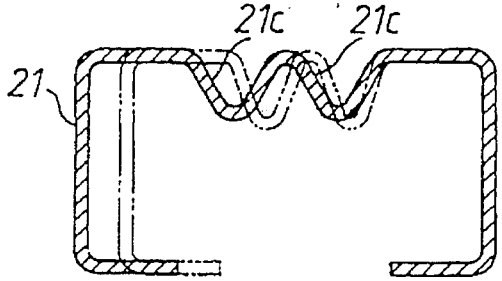

As illustrated in FIGS. 5(A)–5(F), the lower suspension arm 10 may be modified in cross-section. In a modification shown in FIG. 5(A), the grooved portions 21c, 22c of the upper and lower arm members 21 and 22 are respectively replaced with a plurality of adjacent ridges 21d, 22d. In another modification shown in FIG. 5(B), the grooved portions 21c, 22c of the upper and lower arm members 21 and 22 are respectively replaced with grooved portions 21e, 22e of trapezoid cross-section. In a further modification shown in FIG. 5(C), the grooved portion 21c of upper arm member 21 is replaced with a ridged portion 21f of trapezoid cross-section, while the grooved portion 22c of lower arm member 22 is replaced with a grooved portion 22e of trapezoid cross-section. In a modification shown in FIG. 5(D), the suspension arm 10 is composed of only the upper arm member 21 without provision of the lower arm member 22. In this modification, the upper arm member 21 is formed at its outer peripheries with a pair of longitudinal flanges of U-letter shape in cross-section. In a modification shown in FIG. 5(E), the grooved portion 21c of upper arm member 21 shown in FIG. 5(D) is replaced with a grooved portion 21e of trapezoid cross-section. In a modification shown in FIG. 5(F), the upper arm member 21 shown in FIG. 5(D) is inwardly bent at its outer peripheries.

In the modifications described above, the suspension arm 10 is buckled or deformed at its grooved portions 21c, 21e, 22e or ridged portions 21d, 21f, 22d when applied with a great impact force in the fore-and-aft direction of the vehicle. This is effective to absorb the impact applied to the suspension arm 10 in the fore-and-aft direction of the vehicle. On the other hand, the grooved portions or ridged portions of suspension arm 10 are useful to enhance transverse stiffness against an impact applied in the lateral direction of the vehicle.

Figure 6A:
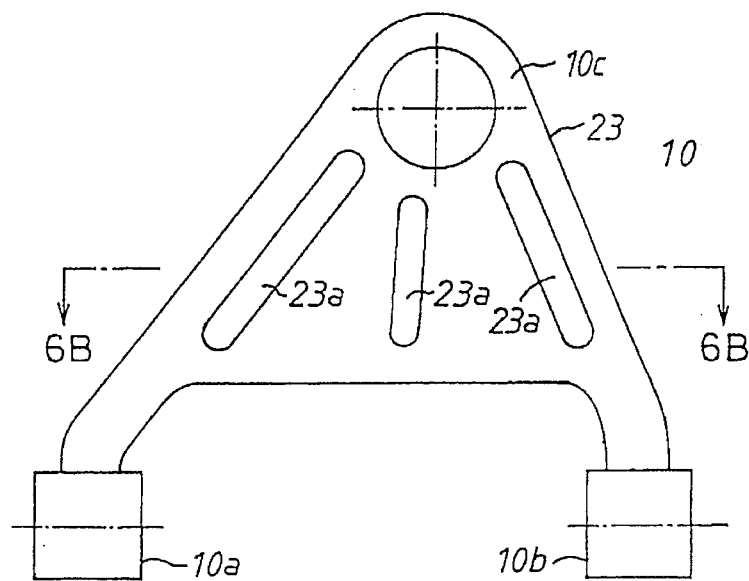
FIG. 6(A) is a plan view of a third embodiment of a lower suspension arm in accordance with the present invention.
Figure 6B:
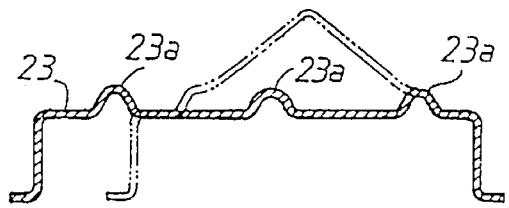
FIG. 6(B) is a cross-sectional view taken along line 6B—6B in FIG. 6(A)

Illustrated in FIGS. 6(A) and 6(B) is a third embodiment of a lower suspension arm 10 in accordance with the present invention, wherein the lower suspension arm 10 is made of a single sheet metal 23 pressed in an A-shape. In this embodiment, the suspension arm 10 has the same front mounting portion 10a and support portion 10c as those in the first embodiment shown in FIG. 2(A) and a rear mounting portion 10b which is mounted on the side rail 11 for rotary movement about the horizontal axis line of side rail 11. The sheet metal 23 is formed with a plurality of spaced ridges 23a which are extended from the support portion 10c toward the front and rear mounting portions 10a and 10b.

Figure 7:
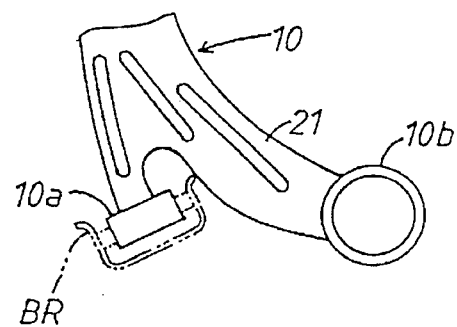
FIG. 7 is a plan view showing a buckled condition of the lower suspension arm shown in FIG. 2(A)
Figure 8A:
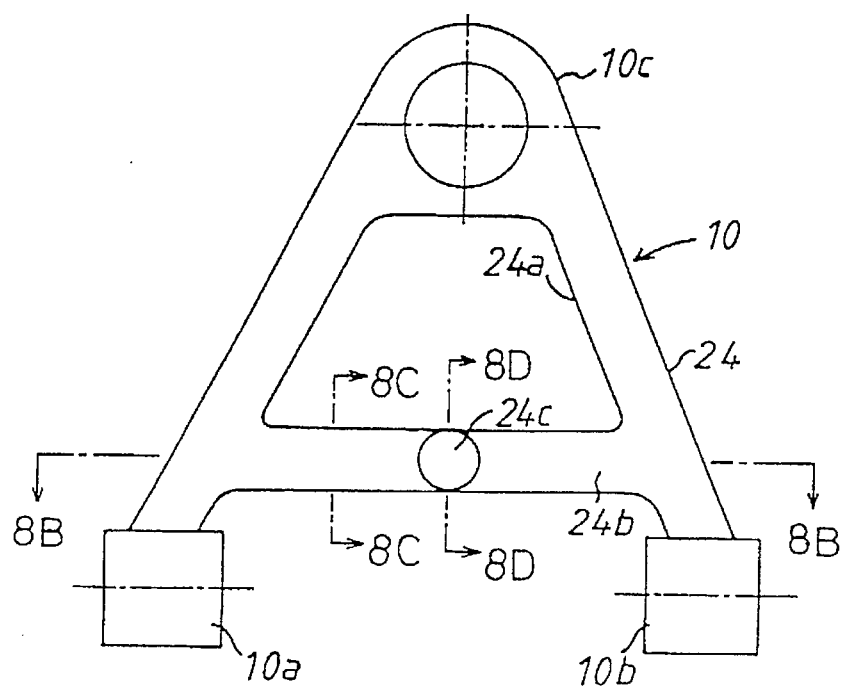
FIG. 8(A) is a plan view of a fourth embodiment of a lower suspension arm in accordance with the present invention.
Figure 8B:
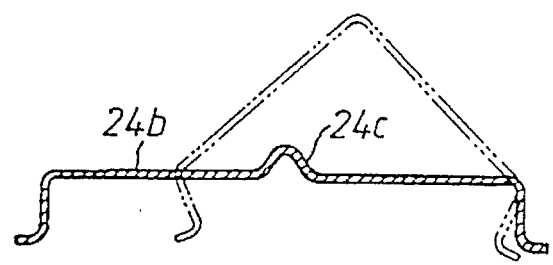
FIG. 8(B) is a cross-sectional view taken along line 8B—8B in FIG. 8(A)
Figure 8C:
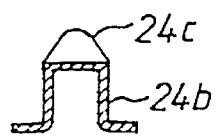
FIG. 8(C) is a cross-sectional view taken along line 8C—8C in FIG. 8(A)
Figure 8D:
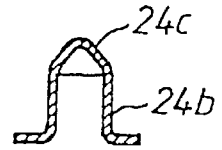
FIG. 8(D) is a cross-sectional view taken along line 8D—8D in FIG. 8(A)
Figure 9A:
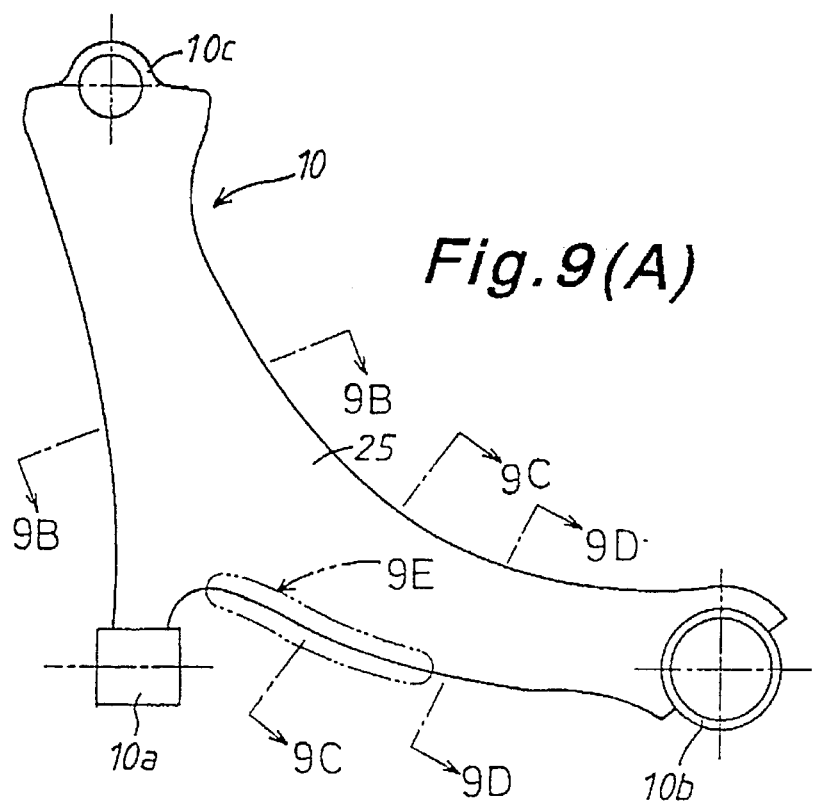
FIG. 9(A) is a plan view of a fifth embodiment of a lower suspension arm in accordance with the present invention.
Figure 9B:
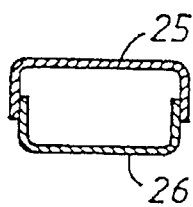
FIG. 9(B) is a cross-sectional view taken along line 9B—9B in FIG. 9(A)
Figure 9C:
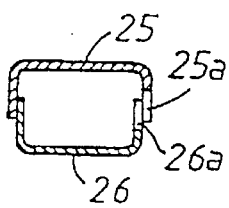
FIG. 9(C) is a cross-sectional view taken along line 9C—9C in FIG. 9(A)
Figure 9D:
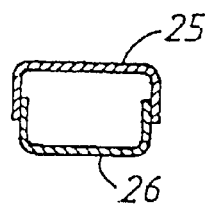
FIG. 9(D) is a cross-sectional view taken along line 9D—9D in FIG. 9(A)
Figure 9E:
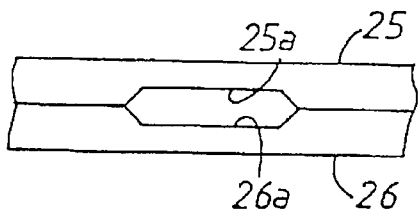
FIG. 9(E) is a side view of a portion indicated by the reference numeral 9E in FIG. 9(A)

In tile third embodiment, the suspension arm 10 is buckled or deformed at its ridged portions 23a as shown by imaginary lines in FIG. 6(B) when applied with a great impact force in the fore-and-aft direction of the vehicle. In this instance, the suspension arm 10 can be deformed in a distance larger than in the first embodiment shown in FIG. 2(A). In contrast with the third embodiment, when the suspension arm 10 of the first embodiment has been deformed in the fore-and-aft direction of the vehicle, a bracket BR assembled with the front mounting portion 10a is brought into contact with an inside portion of the suspension arm 10 as illustrated in FIG. 7. As a result, deformation of the suspension arm 10 in the first embodiment is restricted. On the other hand, the ridged portions 23a are useful to enhance transverse stiffness of the suspension arm 10 against an impact applied in the lateral direction of the vehicle. In a modification of the third embodiment, the ridged portions 23a of suspension arm 10 may be replaced with a plurality of spaced V-grooves as in the first and second embodiments.

In FIG. 8 there is illustrated a fourth embodiment of a lower suspension arm 10 in accordance with the present invention, wherein the lower suspension arm 10 is made of a single sheet metal 24 pressed in an A-shape. The sheet metal 24 of suspension arm 10 is formed at its central portion with a trapezoid opening 24a and a base portion 24b located between front and rear mounting portions 10a and 10b. The base portion 24b of suspension arm 10 is formed at its central portion with a semi-spherical protrusion 24c that forms a low stiffness portion. In this embodiment, the suspension arm 10 is buckled or deformed at its semi-spherical protrusion 24c as shown by imaginary lines in FIG. 8(B) when applied with a great impact force in the fore-and-aft direction of the vehicle. On the other hand, the transverse stiffness of suspension arm 10 is ensured since the semi-spherical protrusion 24c is formed on the base portion 24b between the front and rear mounting portions 10a and 10b.

Figure 10:
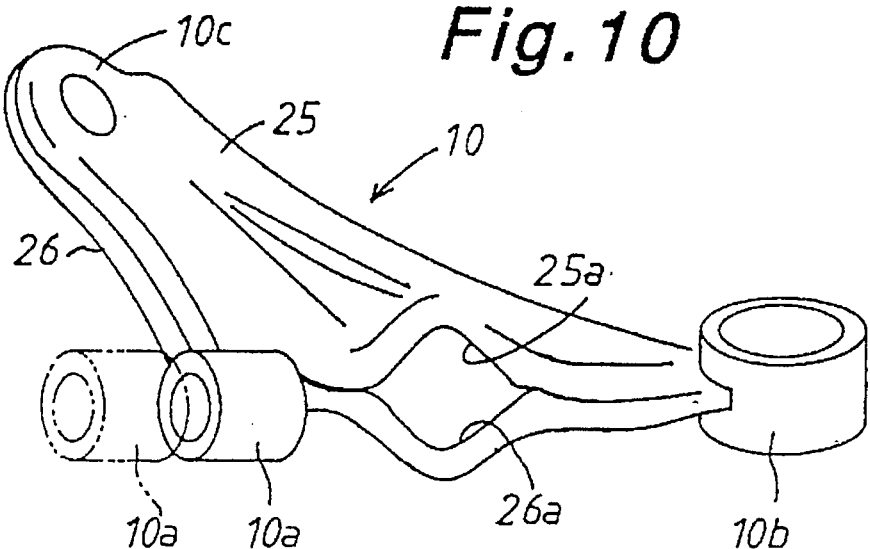
FIG. 10 is a perspective view showing a buckled condition of the lower suspension arm shown in FIG. 9(A)

Illustrated in FIGS. 9(A)–9(E) is a fifth embodiment of a lower suspension arm 10 in accordance with the present invention, wherein a lower suspension arm 10 is composed of upper and lower arm members 25 and 26 which are respectively made of a sheet metal pressed in a L-shape. The upper and lower arm members 25 and 26 are coupled with each other and welded at their outer peripheries to one another. The upper and lower arm members 25, 28 are respectively formed with trapezoidal recesses 25a, 26a at their inside peripheral portions opposed to the vehicle body structure. In this embodiment, the lower suspension arm 10 is buckled or deformed at its recessed portions 25a, 26a as shown in FIG. 10 when applied with a great impact force in the fore-and-aft direction of the vehicle. This is effective to absorb the impact acting on the lower suspension arm 10 in the fore-and-aft direction of the vehicle. On the other hand, the transverse stiffness of suspension arm 10 is ensured since the recessed portions 25a, 28a are located between the front and rear mounting portions 10a and 10b in the fore-and-aft direction of the vehicle.

Figure 11A:
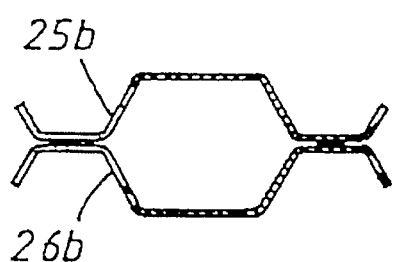
FIGS. 11(A) and 11(B) illustrate a modification of the lower suspension arm shown in FIG. 9(A), in cross-section.
Figure 11B:
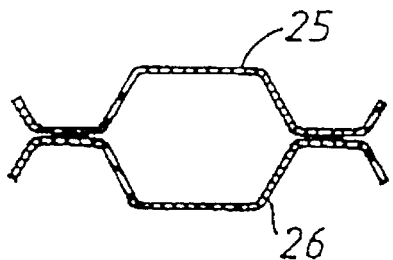
Figure 11C:
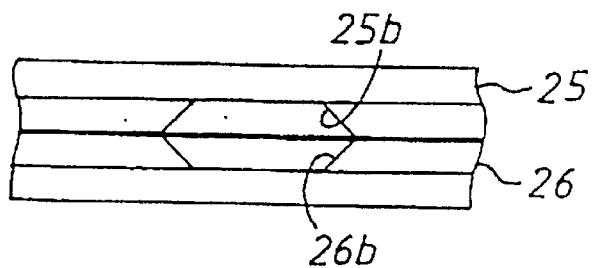
FIG. 11(C) is a side view of the modification shown in FIGS. 11(A) and 11(B)

As illustrated in FIGS. 11(A)–11(C), the suspension arm 10 of the fifth embodiment may be modified in cross-section. In this modification, the upper and lower arm members 25 and 26 are respectively formed at their outer peripheries with longitudinal side flanges of U-shape in cross-section which are welded to one another, and the trapezoid recesses 25a, 26a are formed on the inside peripheral portions of upper and lower arm members 25 and 26 in the same manner as in the suspension arm 10 shown in FIGS. 9(A)–9(E).

Figure 12A:
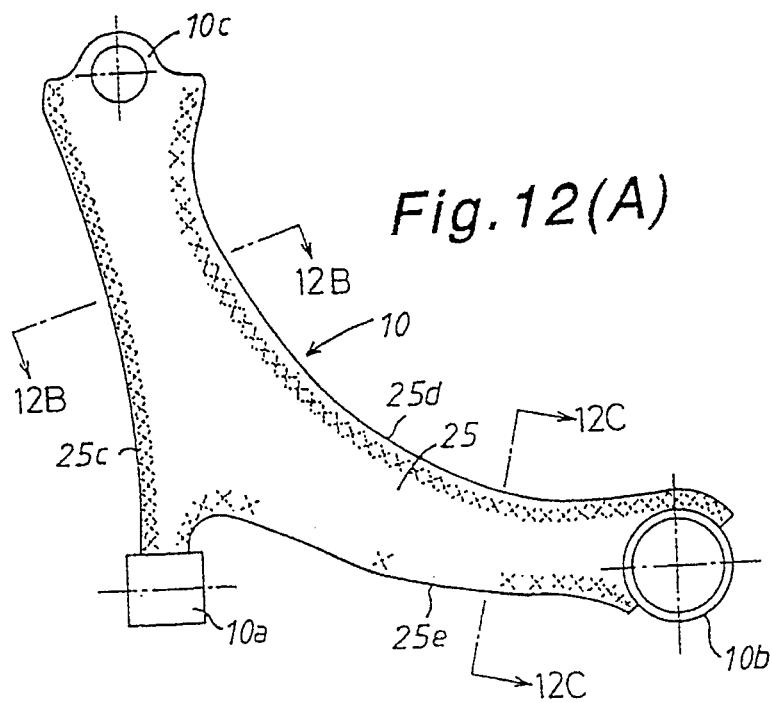
FIG. 12 (A) is a plan view of a sixth embodiment of a lower suspension arm in accordance with the present invention.
FIG. 12(B) is a cross-sectional view taken along line 12B—12B in FIG. 12(A)
FIG. 12(C) is a cross-sectional view taken along line 12C—12C in FIG. 12(A)
Figure 12B:
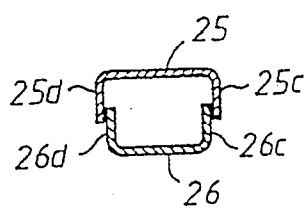
Figure 12C:
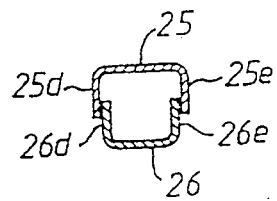
Figure 13:
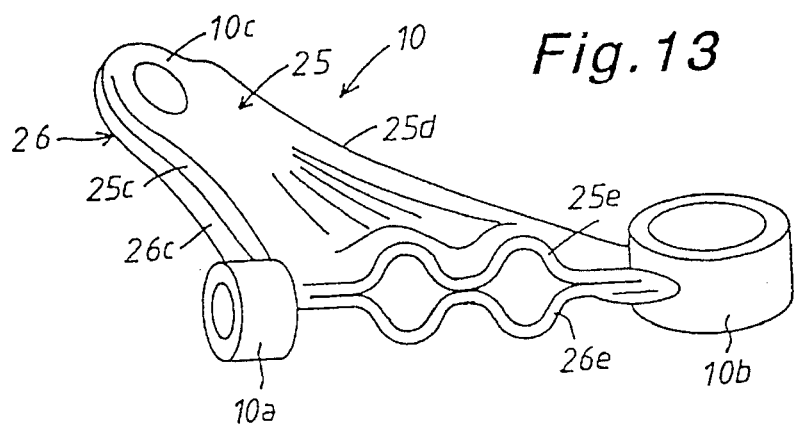
FIG. 13 is a perspective view showing a buckled condition of the lower suspension arm shown in FIG. 12(A)

Illustrated in FIGS. 12(A)–12(C) is a sixth embodiment of a lower suspension arm 10 in accordance with the present invention, wherein the lower suspension arm 10 is composed of upper and lower arm members 25 and 26 each of which is made of sheet metal pressed in an L-shape. The upper and lower arm members 25 and 26 are coupled with each other and welded at their outer peripheries 25c, 25d, 25e, 26c, 26d, 26e to one another. In this embodiment, the outer peripheries 25c, 25d, 26c, 26d of upper and lower arm members 25 and 26 extending from a support portion 10c toward front and rear mounting portions 10a and 10b are welded to one another by spot welding at small intervals, while the outer peripheries 25e, 26e of upper and lower arm members 25 and 26 between the mounting portions 10a and 10b are welded to one another by spot welding at large intervals. In this embodiment, the lower suspension arm 10 is buckled or deformed as shown in FIG. 13 when applied with a great impact force in the fore-and-aft direction of the vehicle. This is effective to absorb the impact acting on the lower suspension arm 10 In the fore-and-aft direction. On the other hand, the transverse stiffness of the lower suspension arm 10 is ensured since the outer peripheries 25c, 25d, 26c, 26d of upper and lower arm members 25 and 26 located in the lateral direction of the vehicle are welded by spot welding at small intervals.

Figure 14A:
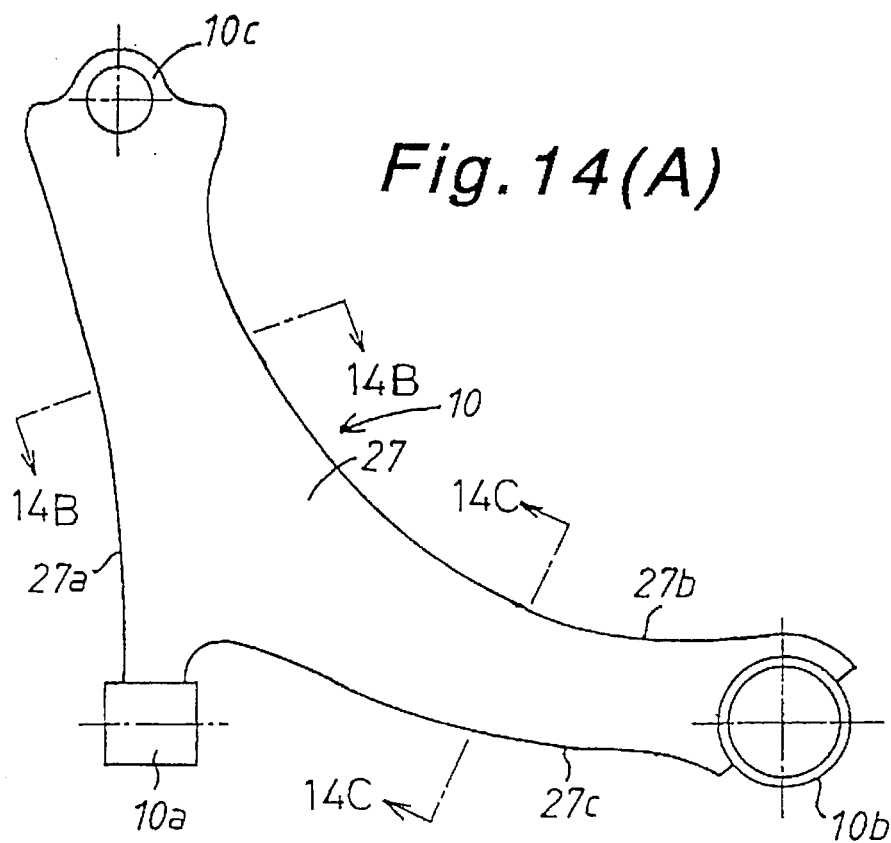
FIG. 14(A) is a plan view of a seventh embodiment of a lower suspension arm in accordance with the present invention.
Figure 14B:
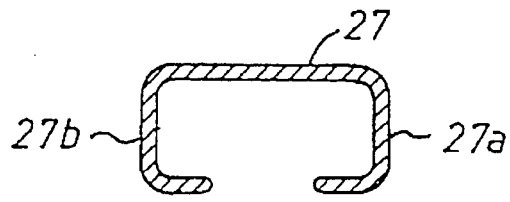
FIG. 14(B) is a cross-sectional view taken along line 14B—14B in FIG. 14(A)
Figure 14C:
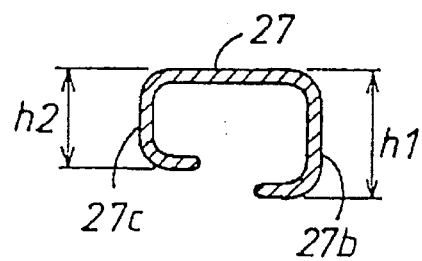
FIG. 14(C) is a cross-sectional view taken along line 14C—14C in FIG. 14(A)
Figure 15A:
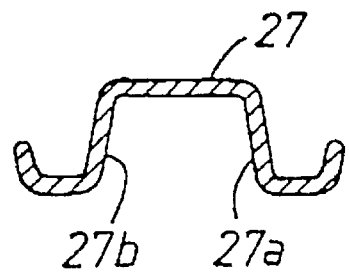
FIGS. 15(A) and 15(B) illustrate a modification of the lower suspension arm shown in FIG. 14(A), in cross-section.
Figure 15B:
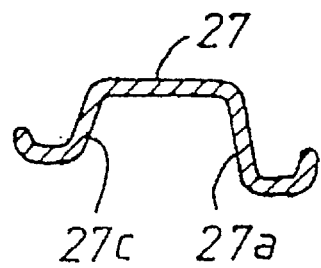

Illustrated in FIGS. 14(A) to 14(C) is a seventh embodiment of a lower suspension arm 10 in accordance with the present invention, wherein the lower suspension arm 10 is composed of a single arm member 27 which is made of sheet metal pressed in an L-shape. The arm member 27 has outer peripheries 27a, 27b, 27c which are bent downwardly and inwardly. The height h2 of the outer periphery 27c of arm member 27 between front and rear mounting portions 10a and 10b is made lower than the height h1 of the outer peripheries 27a, 27b of arm member 27 extending from a support portion 10c toward the front and rear mounting portions 10a and 10b. In this embodiment, the lower suspension arm 10 is buckled or deformed at its outer periphery 27c when applied with a great impact force in the fore-and-aft direction of the vehicle. On the other hand, the outer perphexies 27a, 27b of arm member 27 are useful to enhance transverse stiffness of the lower suspension arm 10 against an impact applied in the lateral direction of the vehicle. The lower suspension arm 10 of the seventh embodiment may be modified as shown in FIGS. 15(A) and 15(B), wherein the outer peripheries 27a, 27b and 27c of the single arm member 27 each are formed with a longitudinal side flange of U-shape in cross-section. In this modification, the height of the outer periphery 27c of arm member 27 between the mounting portions 10a and 10b is made lower than the height of the outer peripheries 27a, 27b of arm member 27 extending from the support portion 10c toward the mounting portions 10a and 10b.

Figure 16:
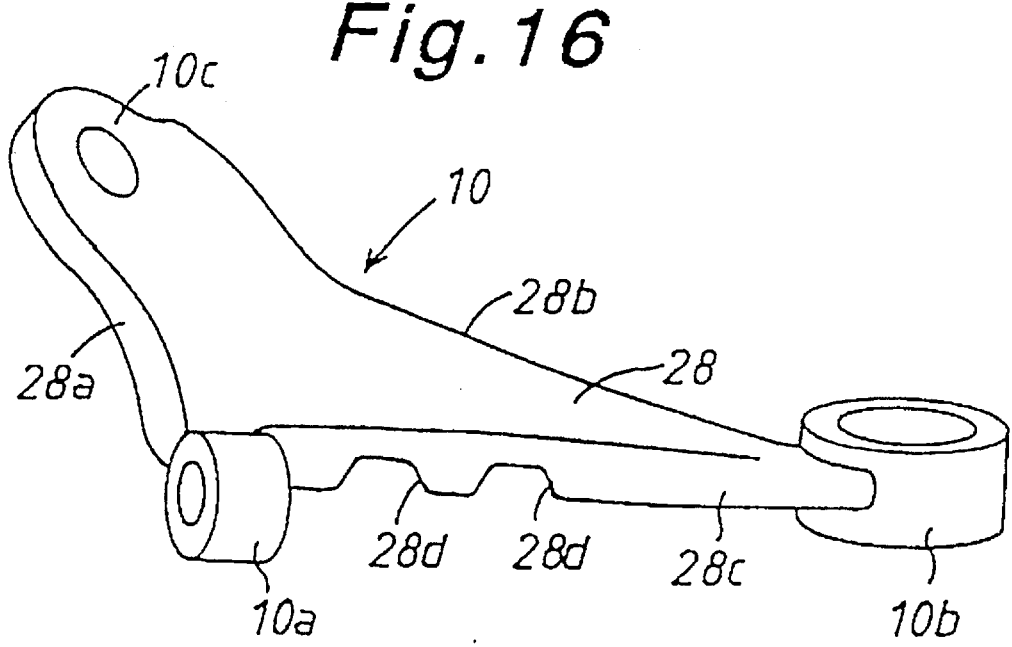
FIG. 16 is a plan view of an eighth embodiment of a lower suspension arm in accordance with the present invention.

Illustrated in FIG. 16 is an eighth embodiment of a lower suspension arm 10 in accordance with the present invention, wherein the lower suspension arm 10 is composed of a single arm member 28 which is made of sheet metal pressed in an A-shape. The arm member 28 has outer peripheries 28a, 28b and 28c which are bent downwardly. The arm member 28 is formed with spaced recesses 28d at its outer periphery 28c between mounting portions 10a and 10b of the lower suspension arm 10. In this embodiment, the lower suspension arm 10 is buckled or deformed at its recessed portions 28d when applied with a great impact force in the fore-and-aft direction of the vehicle. On the other hand, the downwardly bent outer peripheries 28a and 28b of arm member 28 are useful to enhance transverse stiffness of the lower suspension arm 10 against an impact applied in the lateral direction of the vehicle.

Figure 17A:
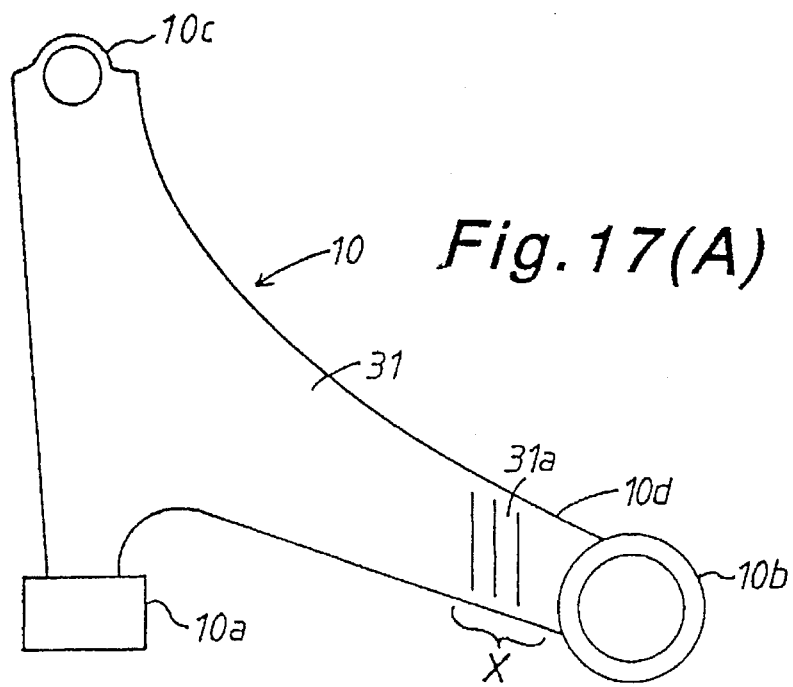
FIG. 17(A) is a plan view of a ninth embodiment of a lower suspension arm in accordance with the present invention.
Figure 17B:
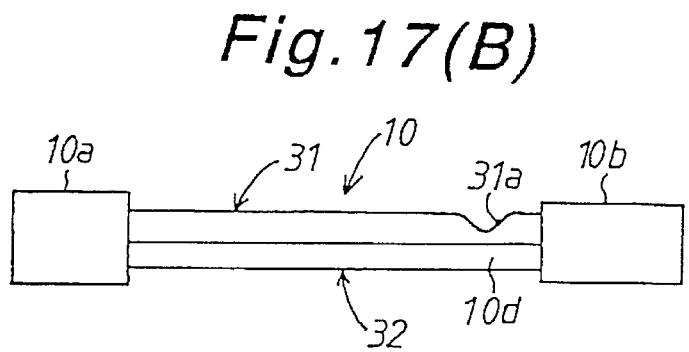
FIG. 17(B) is a side view of the lower suspension arm shown in FIG. 17(A)
Figure 17C:
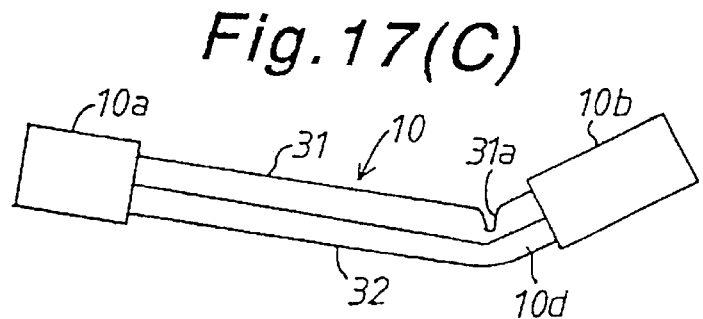
FIG. 17(C) is a side view showing a buckled condition of the lower suspension arm shown in FIG. 17(A)
Figure 18:
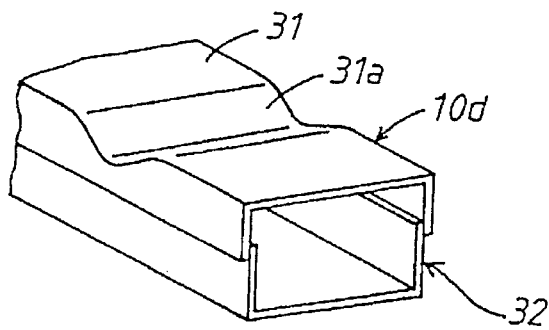
FIG. 18 is a perspective view showing a concave portion of the lower suspension arm shown in FIG. 17(A)
Figure 19:
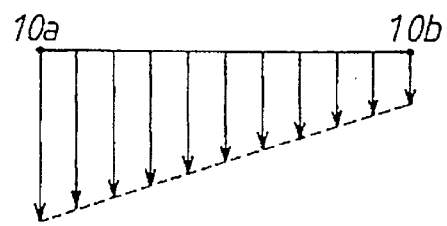
FIG. 19 illustrates distribution of bending moment acting on the lower suspension arm shown in FIG. 17(A)

Illustrated in FIGS. 17(A)–17(C) and 18 is a ninth embodiment of a lower suspension arm 10 in accordance with the present invention, wherein the lower suspension arm 10 is composed of upper and lower arm members 31 and 32 each of which is made of sheet metal pressed in an L-shape. The upper and lower arm members 31 and 32 are coupled with each other and welded at their outer peripheries to one another. The upper arm member 31 has a concave portion 31a formed in the lateral direction of the vehicle at a position 10d adjacent rear mounting portion 10b of the suspension arm 10. In this embodiment, the suspension arm 10 is buckled or deformed at its concave portion 31a as shown in FIG. 17(C) when applied with a great impact force in the fore-and-aft direction of the vehicle. On the other hand, the transverse stiffness of the suspension arm 10 is ensured since the concave portion 31a of upper arm member 31 is positioned adjacent the rear mounting portion 10b of suspension arm 10 mounted on the vehicle body structure. The construction of the lower suspension arm 10 is characterized in that a support portion 10c is located in a lateral direction of a front mounting portion 10a and that the rear mounting portion 10b is located in a position apart from the support portion 10c more than the front mounting portion 10a. With such an arrangement of the mounting portions 10a and 10b relative to the support portion 10c, bending moment acting on the suspension arm 10 becomes small from the front mounting portion 10a toward the rear mounting portion 10b as shown in FIG. 19. Thus, the transverse stiffness at the concave portion 31a of upper arm member 31 is ensured against an impact applied to the support portion 10c of suspension arm 10 from the road wheel 12.

Figure 20:
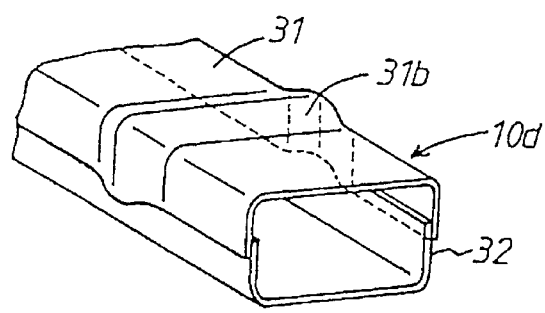
FIG. 20 is a perspective view of a modification of the lower suspension arm shown in FIG. 17(A)
Figure 21:
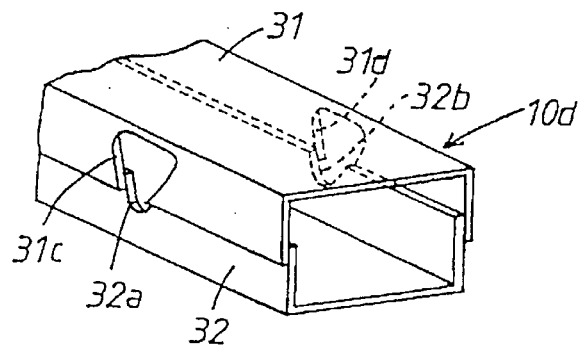
FIG. 21 is a perspective view of another modification of the lower suspension arm shown in FIG. 17(A)

As illustrated in FIGS. 20 and 21, the lower suspension arm 10 may be modified at its concave portion 31a. In a modification shown in FIG. 20, the concave portion 31a of upper arm member 31 is replaced with a convex portion 31b formed in the lateral direction of the vehicle. In another modification shown in FIG. 21, the concave portion 31a of upper arm member 31 is replaced with a pair of triangular openings formed by a pair of recesses 31c, 31d formed on opposite sides of the upper arm member 31 and a pair of recesses 32a, 32b formed on opposite sides of the lower arm member 32. In these modifications, the lower suspension arm 10 is buckled or deformed at its convex portion 31b or triangular openings when applied with a great impact force in the fore-and-aft direction of the vehicle.

Figure 22:
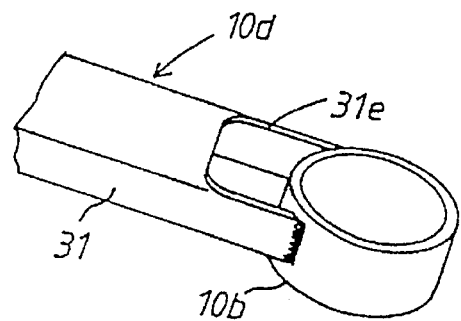
FIGS. 22–24 illustrate other modifications of the lower suspension arm shown in FIG. 17(A)
Figure 23:
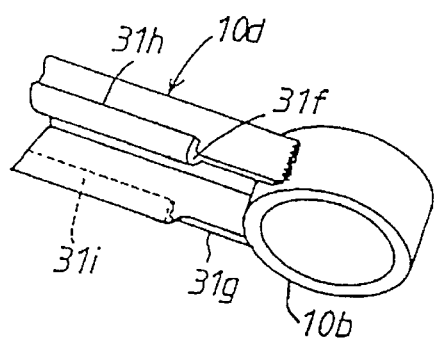
Figure 24:
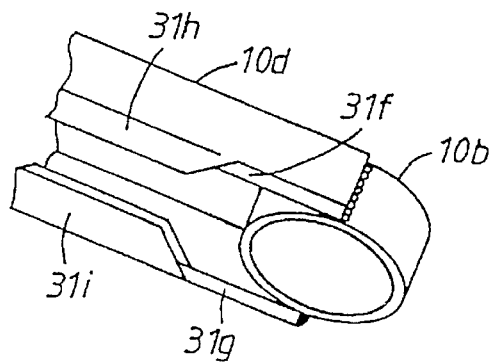

As illustrated in FIGS. 22–24, the lower suspension arm 10 may be further modified. In a modification shown in FIG. 22, the lower suspension arm 10 is composed of only the upper arm member 31, wherein the upper arm member 31 is formed with a recess 31e instead of the concave portion 31a shown in FIGS. 17(A) and 17(B). In another modification shown in FIG. 23, the lower suspension arm 10 is composed of only the upper arm member 31, wherein the upper arm member 31 is integrally formed with a pair of outwardly bent longitudinal side flanges 31h and 31i which are recessed at portions 31f, 31g adjacent the rear mounting portion 10b. In a modification shown in FIG. 24, the lower suspension arm 10 is composed of only the upper arm member 31, wherein the upper arm member 31 is formed with a pair of inwardly bent longitudinal side flanges 31h, 31i which are recessed at portions 31f, 31g adjacent the rear mounting portion 10b. In these modifications, the lower suspension arm 10 is buckled or deformed at its recessed portions 31e or 31f, 31g when applied with a great impact force in the fore-and-aft direction of the vehicle.

Figure 25A:
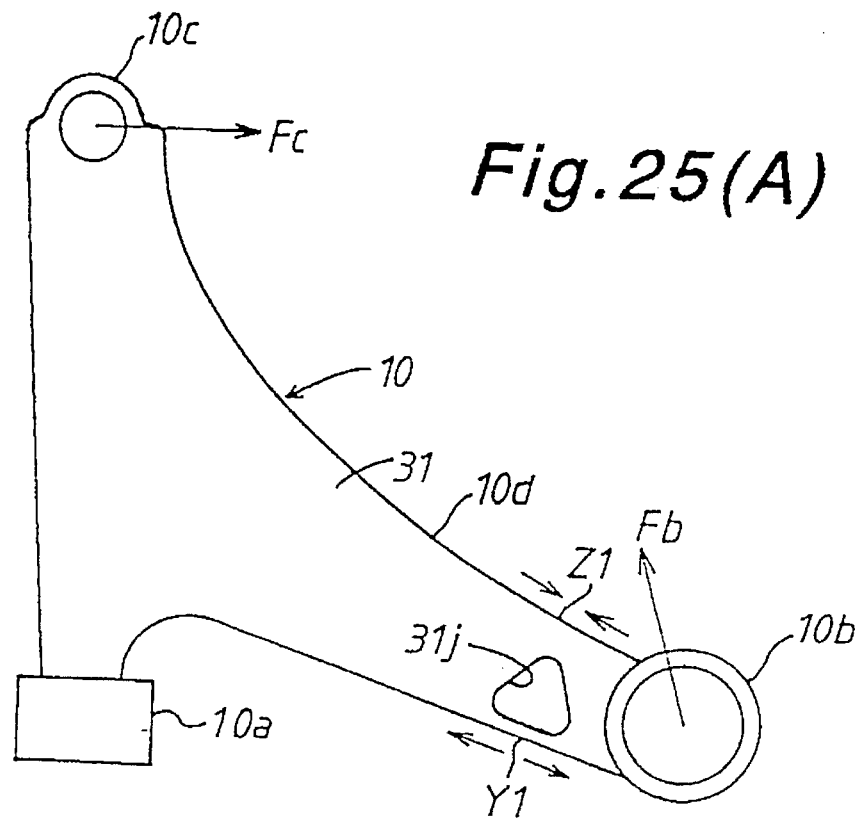
FIG. 25(A) is a plan view of a tenth embodiment of a lower suspension arm in accordance with the present invention.
Figure 25B:
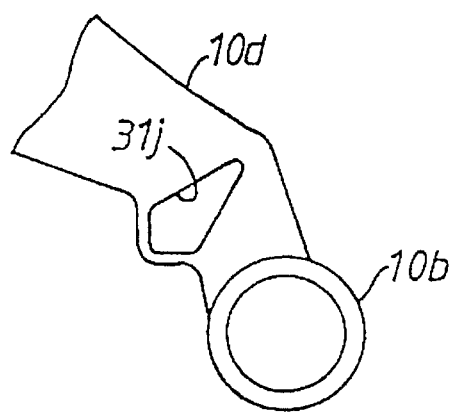
FIG. 25(B) illustrates a buckled condition of the lower suspension arm shown in FIG. 25(A)

Illustrated in FIG. 25(A) is a tenth embodiment of a lower suspension arm 10 in accordance with the present invention, wherein the lower suspension arm 10 is composed of upper and lower arm members 31 and 32 in the same manner as in the lower suspension arm 10 shown in FIG. 17(A). In this embodiment, the upper and lower arm members 31 and 32 are respectively formed with triangular openings 31j at portions adjacent the rear mounting portion 10b in such a manner that each base of the triangular openings 31j is located in parallel with an inside portion Y1 of suspension arm 10 opposed to the vehicle body structure. For simplicity, only upper arm member 31 and opening 31j are shown. However, lower member 32 has a corresponding opening. In this embodiment, the lower suspension arm 10 is buckled or deformed at its triangular opening portions 31j in a horizontal plane as shown in FIG. 25(B) when applied with a great impact force in the fore-and-aft direction of the vehicle. This is effective to absorb the impact applied to the lower suspension arm 10 in the fore-and-aft direction of the vehicle. When the lower suspension arm 10 is applied with a backward impact force Fc at its support portion 10c in the fore-and-aft direction in sudden braking operation, the rear mounting portion 10b of suspension arm 10 is applied with a reaction force Fb. In this instance, the inside portion Y1 of suspension arm 10 is applied with a tension force, while an outside portion Z1 of suspension arm 10 is applied with a compression force. Thus, the transverse strength of suspension arm 10 is ensured against the impact force Fc in sudden braking operation.

Figure 26A:
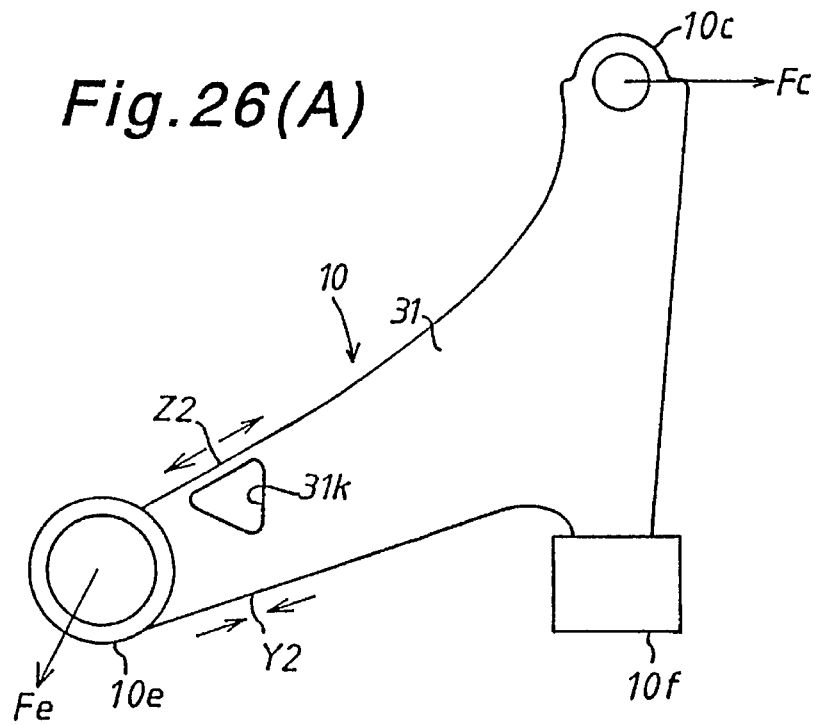
FIG. 26(A) is a plan view of an eleventh embodiment of a lower suspension arm in accordance with the present invention.

Illustrated in FIG. 26(A) is a modification of the lower suspension arm 10 shown in FIG. 25(A), wherein the front mounting portion of suspension arm 10 is in the form of a cylindrical sleeve 10e that is mounted on the vehicle body structure for rotary movement about a vertical axis, and wherein the rear mounting portion of suspension arm 10 is in the form of a cylindrical sleeve 10f that is mounted on the vehicle body structure for rotary movement about a horizontal axis. In this modification, the support portion 10c of suspension arm 10 is located in a lateral direction of the rear mounting portion 10f, while the front mounting portion 10e is located in a position forwardly apart from the support portion 10c. In such an arrangement as described above, the upper and lower arm members 31 and 32 are respectively formed with triangular openings 31k at portions adjacent the front mounting portion 10e in such a manner that each base of the triangular openings 31k is located in parallel with an outside portion Z2 of suspension arm 10. For simplicity, only upper arm member 31 and triangular opening 31k are shown. However, lower member 32 has a corresponding triangular opening.

Figure 26B:
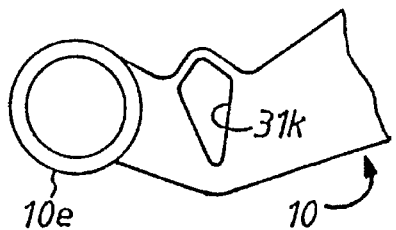
FIG. 26(B) illustrates a buckled condition of the lower suspension arm shown in FIG. 26(A)
Figure 27:
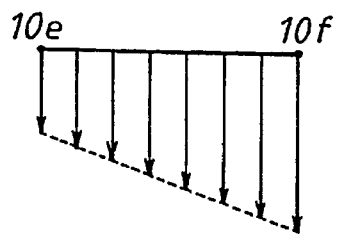
FIG. 27 illustrates distribution of bending moment acting on the lower suspension arm shown in FIG. 26(A).

In the lower suspension arm 10 shown in FIG. 26(A), an external force applied to the support portion 10c causes bending moment on the suspension arm 10. In this instance, the bending moment acting on the suspension arm 10 becomes small from the rear mounting portion 10f toward the front mounting portion 10e as shown in FIG. 27. Thus, sufficient strength at a portion 10b formed with the triangular openings 31k is ensured without causing any deformation of the suspension arm 10. When applied with a great impact in the fore-and-aft direction of the vehicle, the triangular openings 31k are buckled or deformed as shown in FIG. 26(B) to absorb the impact acting on the suspension arm 10. When the suspension arm 10 is applied with a backward impact force Fc at its support portion 10c in sudden braking operation, the front mounting portion 10e of suspension arm 10 is applied with a reaction force Fe. In this instance, the outside portion Z2 of suspension arm 10 is applied with a tension force, while the inside portion Y2 of suspension arm 10 is applied with a compression force. Thus, the transverse strength of suspension arm 10 is ensured against the impact force Fc in a sudden braking operation.

Although in the above-described embodiments, the present invention has been adapted to the lower suspension arm 10, it is obvious that the present invention may be adapted to an upper suspension arm.

What is claimed is:

1. A suspension arm adapted for use in a suspension system of an automotive vehicle, the suspension arm having a pair of spaced mounting portions mounted on a vehicle body structure at two positions spaced in a fore-and-aft direction of the vehicle and a support portion for supporting a road wheel mounted thereon, wherein the suspension arm is provided with deformable means located between the mounting portions for providing enhanced transverse stiffness of the suspension arm perpendicular to the fore-and-aft direction and for buckling when applied with an impact force in the fore-and-aft direction of the vehicle.

2. A suspension arm adapted for use in a suspension system of an automotive vehicle, said suspension arm including an arm member made of sheet metal pressed in a predetermined shape and having a pair of spaced front and rear mounting portions mounted on a vehicle body structure at two positions spaced in a fore-and-aft direction of the vehicle and a support portion supporting thereon a road wheel, wherein said arm member has deformable means located between the front and rear mounting portions for ensuring transverse stiffness of the suspension arm in a lateral direction of the vehicle and for buckling when applied with an impact force in the fore-and-aft direction of the vehicle.

3. A suspension arm as recited in claim 2, wherein the deformable means is a deformable portion of said arm member in the form of a grooved portion extending from the support portion toward the front and rear mounting portions.

4. A suspension arm as recited in claim 2, wherein the deformable means is a deformable portion of said arm member in the form of a plurality of grooves extending from the support portion toward the front and rear mounting portions.

5. A suspension arm as recited in claim 2, wherein the deformable means is a deformable portion of said arm member in the form of a ridged portion extending from the support portion toward the front and rear mounting portions.

6. A suspension arm as recited in claim 2, wherein the deformable means is a deformable portion of said arm member in the form of a plurality of ridges extending from the support portion toward the front and rear mounting portions.

7. A suspension arm as recited in claim 2, wherein the deformable means is a deformable portion of said arm member in the form of a low stiffness portion formed on a base portion between the front and rear mounting portions.

8. A suspension arm as recited in claim 2, wherein said suspension arm member comprises upper and lower arm members coupled together, the deformable means being a deformable portion of said suspension arm member in the form of trapezoidal recesses formed at inside peripheral portions of the upper and lower arm members between the front and rear mounting portions.

9. A suspension arm as recited in claim 2, wherein the deformable means is a deformable portion of said arm member in the form of a concave portion formed in a lateral direction of the vehicle at a position adjacent the rear mounting portion.

10. A suspension arm as recited in claim 2, wherein the deformable means is a deformable portion of said arm member in the form of a convex portion formed in the lateral direction of the vehicle at a position adjacent the rear mounting portion.

11. A suspension arm as recited in claim 2, wherein the deformable means is a deformable portion of said arm member in the form of a recessed portion formed at a position adjacent the rear mounting portion.

12. A suspension arm as recited in claim 2, wherein the deformable means is a deformable portion of said arm member in the form of an opening formed at a position adjacent the rear mounting portion.

13. A suspension arm as recited in claim 2, wherein the deformable means is a deformable portion of said arm member in the form of an opening formed at a position adjacent the front mounting portion.

14. A suspension arm adapted for use in a suspension system of an automotive vehicle, said suspension arm including upper and lower arm members each made of sheet metal pressed in a predetermined shape, said arm members being coupled with each other and integrated at their outer peripheries and having a pair of spaced front and rear mounting portions mounted on a vehicle body structure at two positions spaced in a fore-and-aft direction of the vehicle and a support portion for supporting a road wheel mounted thereon, wherein said arm members are welded together at small intervals between welds between the support portion and the front and rear mounting portions and welded together at large intervals between welds between the front and rear mounting portions to form a deformable portion to be buckled when applied with an impact force in the fore-and-aft direction of the vehicle.

15. A suspension arm adapted for use in a suspension system of an automotive vehicle, the suspension arm having a pair of spaced mounting portions mounted on a vehicle body structure at two positions spaced in a fore-and-aft direction of the vehicle and a support portion supporting a road wheel thereon, wherein the suspension arm is in the form of a single support structure provided with deformable means located between the mounting portions for providing enhanced transverse stiffness of the suspension arm perpendicular to the fore-and-aft direction and for buckling when applied with an impact force in the fore-and-aft direction of the vehicle.

* * * * *